No. 688,156. Patented Dec. 3, 1901.
M. G. BUNNELL.
AUTOMOBILE GRADING AND DITCHING MACHINE.
(Application filed Feb. 25, 1901.)
(No Model.) 3 Sheets—Sheet 2.
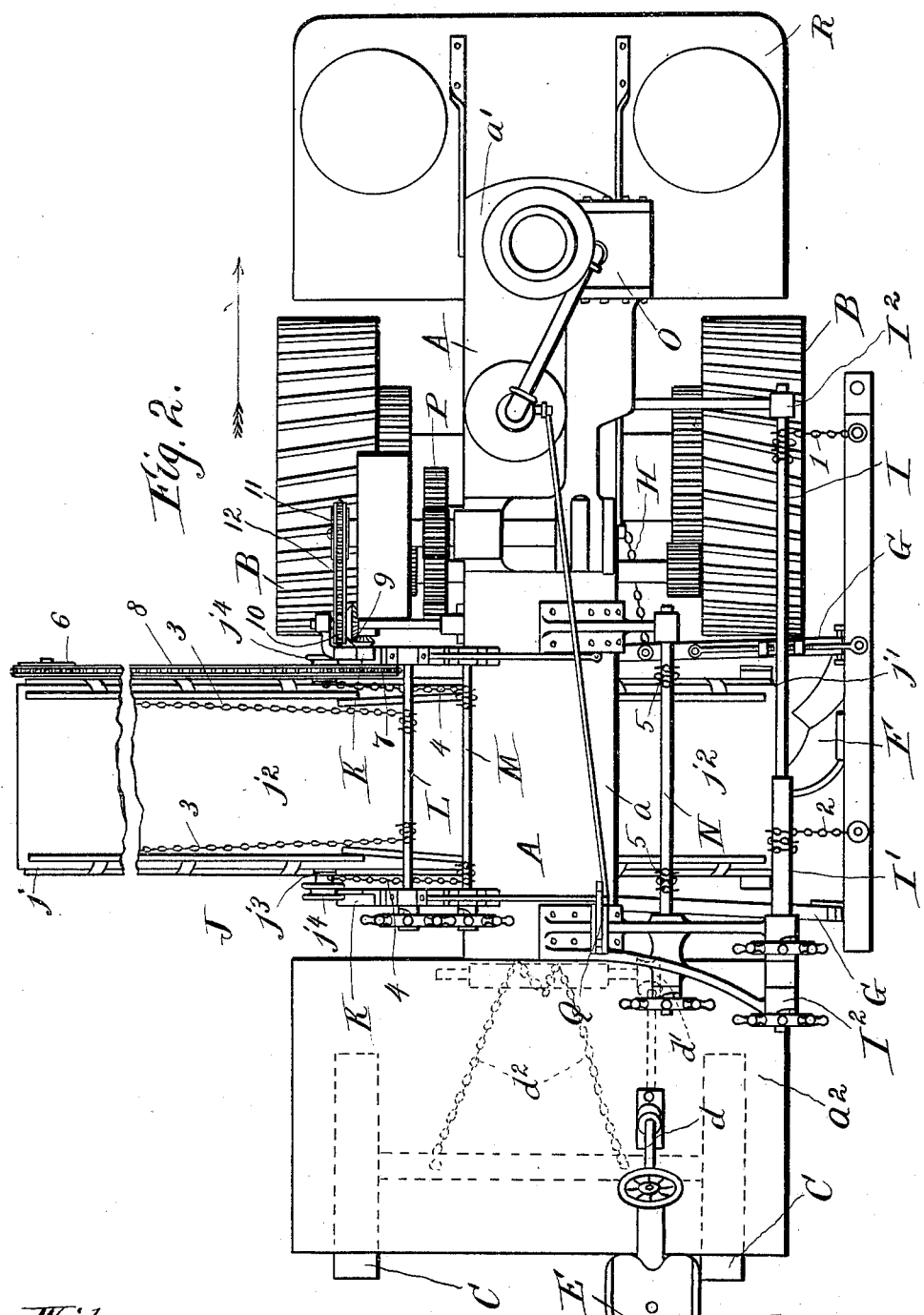
Witnesses:
A. M. Belfield
H. L. Hanson
Inventor;
Morton G. Bunnell,
by Arthur F. Durand
Atty.

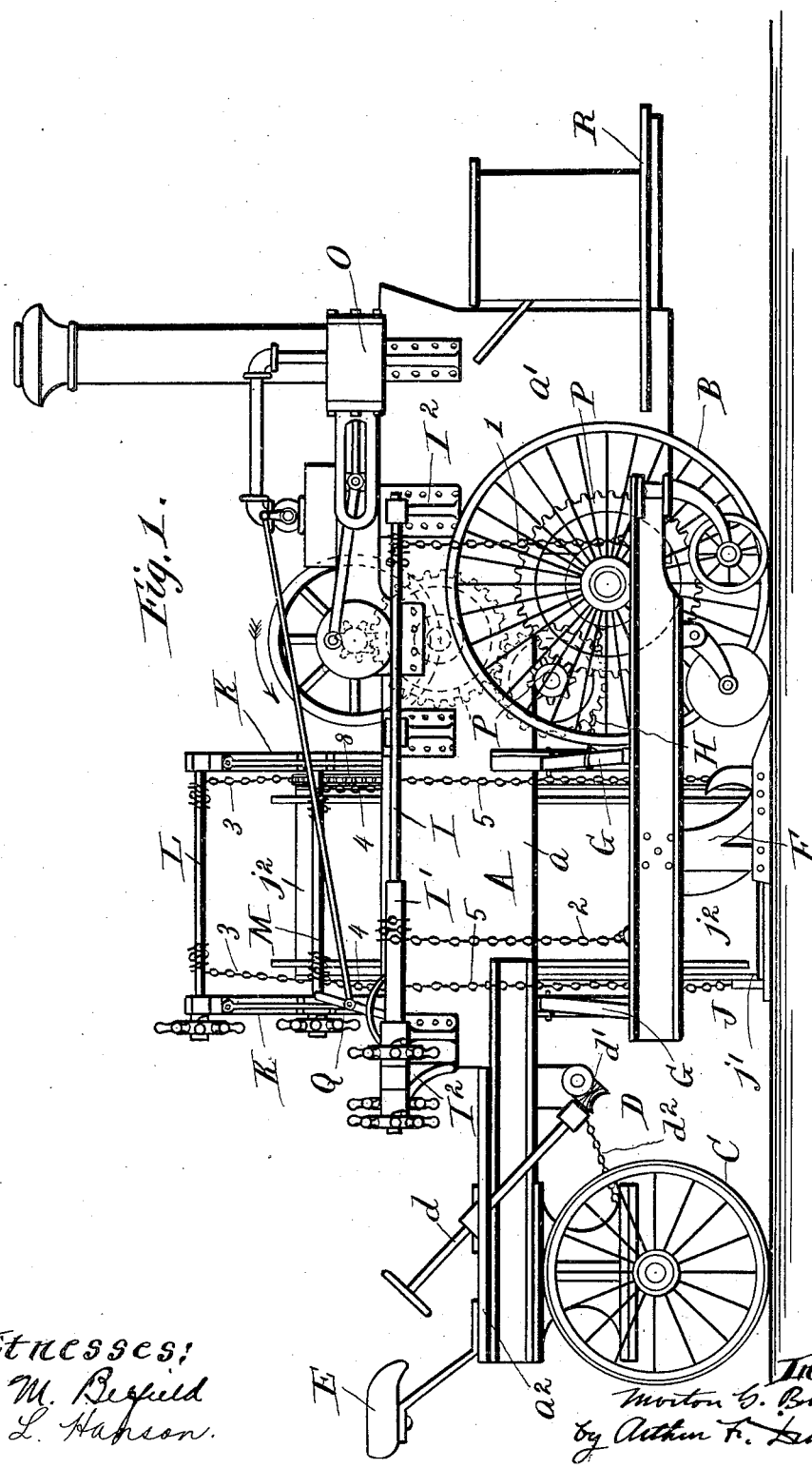

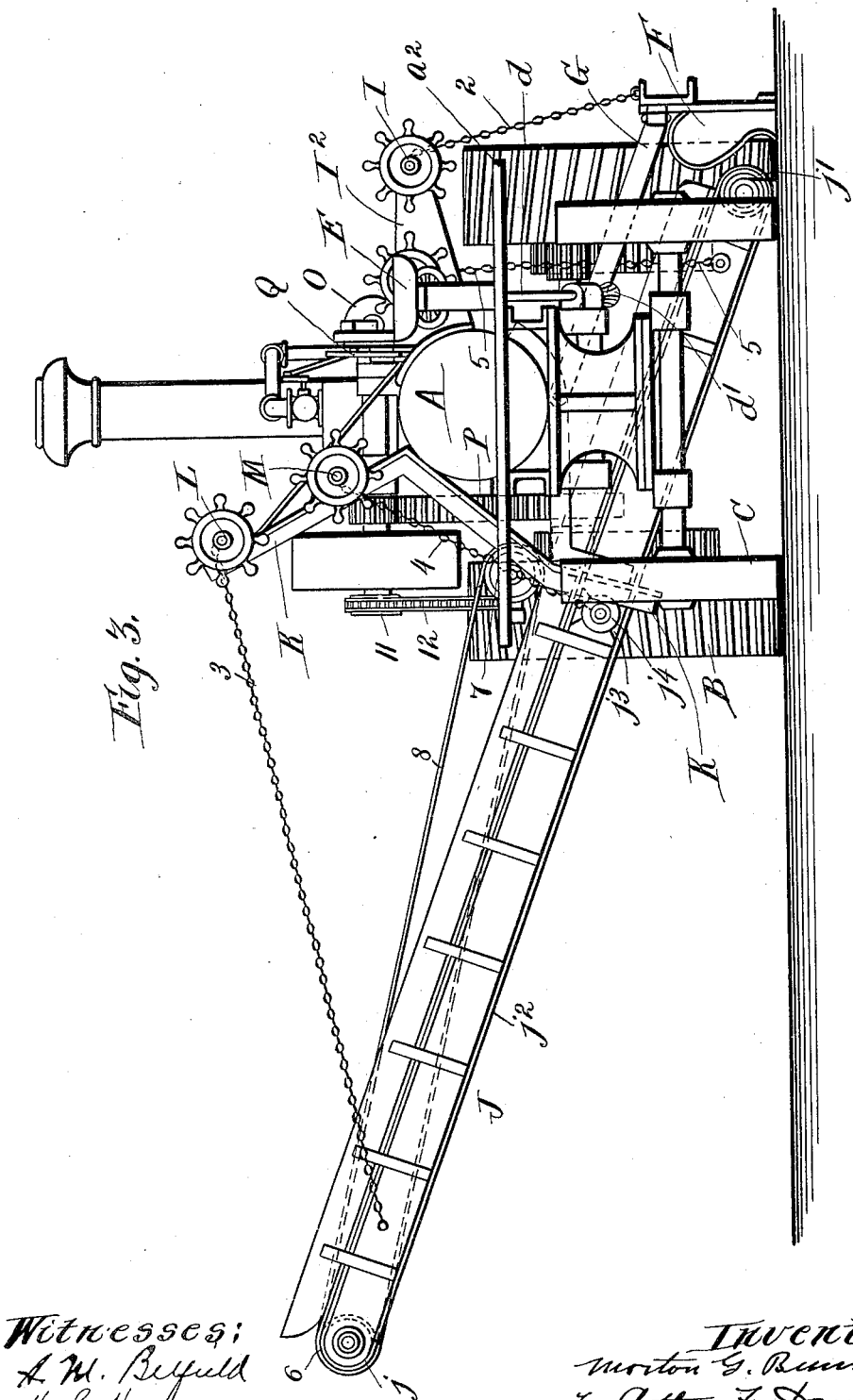

UNITED STATES PATENT OFFICE.

MORTON G. BUNNELL, OF CHICAGO, ILLINOIS.

AUTOMOBILE GRADING AND DITCHING MACHINE.

SPECIFICATION forming part of Letters Patent No. 688,156, dated December 3, 1901.

Application filed February 25, 1901. Serial No. 48,728. (No model.)

*To all whom it may concern:*

Be it known that I, MORTON G. BUNNELL, a citizen of the United States, residing at Chicago, in the county of Cook and State of Illinois, have invented a certain new and useful Improvement in Automobile Grading and Ditching Machines, of which the following is a full, clear, concise, and exact description, reference being had to the accompanying drawings, forming a part of this specification.

My invention relates to that type of excavating-machines in which a plow is employed for tearing up the soil and in which the soil thus torn up is delivered to a belt conveyer, the conveyer being arranged to discharge the soil at one side of the line of travel and the machine being preferably driven or propelled by steam.

The object of my invention is to provide a self-propelled excavating-machine which can be easily and conveniently operated and controlled, which can be driven forward with comparative certainty of action and involving certain features of improvement tending to increase the general efficiency and to render a machine of this character satisfactory and serviceable.

To the foregoing and other useful ends my invention consists in matters hereinafter set forth and claimed.

In the accompanying drawings, Figure 1 is a side elevation of a steam excavating-machine embodying the principles of my invention. Fig. 2 is a plan of the machine shown in Fig. 1. Fig. 3 is a rear end elevation of the same.

The boiler A can be of any suitable known or approved construction, but is preferably provided with a cylindric waist portion $a$ and a fire-box portion $a'$. The traction-wheels B are arranged at either side of said fire-box portion. An extension or platform $a^2$ is preferably provided at the rear of said boiler. The steering-wheels C are located below this extension or platform and are controlled by the steering-gear D. Said steering-gear can be of any suitable form—as, for example, it may consist of a hand-wheel shaft $d$, connected with the rear axle through the medium of worm-gearing $d'$ and a chain $d^2$ and preferably located, together with the seat E, at the right-hand side of said platform.

The plow F is arranged, preferably, at the right-hand side of the waist portion of the boiler, or, in other words, in rear of the right-hand traction-wheel. Swinging bars G can be employed for connecting the plow with the boiler. The chain H connects the forward bar with the fire-box. In this way the plow receives its draft from the forward traction-wheels.

Any suitable device can be employed for raising and lowering the plow. For example, a shaft I, having a sleeve I', can be mounted in bearings I², secured to the boiler, and such shaft and sleeve can be connected, respectively, with the forward and rear ends of the plow-beam by means of the chains 1 and 2. The rear ends of said shaft and sleeve are provided with hand-wheels. The shaft and sleeve can be rotated independently of each other, and in this way the chains can be wound up or let out either separately or together, so as to either tilt the plow or raise or lower it bodily. It will be observed that the device thus provided for adjusting the plow up and down is operable from the rear platform.

The transversely-disposed belt conveyer J is arranged with its lower end in position to receive the dirt from the plow and to then carry the dirt and discharge it at the side of the machine. The conveyer can be of any suitable construction, but preferably comprises the upper and lower rolls $j$ and $j'$, a belt $j^2$, and suitable framework, the latter being preferably in two sections and jointed at $j^3$. At this latter point are the sheaves $j^4$, which engage the lower portions of the brackets K, said brackets being secured to the boiler. Hand-wheel shafts L and M are mounted upon the upper portions of said brackets, and a similar hand-wheel shaft N is mounted on the brackets I². Chains 3 connect the outer end of the conveyer with shaft L, and similar chains 4 connect the jointed portion of the conveyer with shaft M. Chains 5 connect the lower end of the conveyer with shaft N. In this way the conveyer is suspended by chains from adjusting devices operable from the rear platform.

The engine O can be of any suitable known or approved construction. The said engine is preferably mounted upon the forward portion of the boiler. The traction-wheels B are driven from this engine through the medium of suitable gearing P. A throttle-valve Q is provided and preferably arranged so as to be within reach of the attendant on the rear platform.

Any suitable power-transmitting connection can be employed for driving the conveyer. Preferably, however, the conveyer is driven from the engine through the medium of gearing—such, for example, as the sprockets and chain 6 and 7 and 8, the bevel-gearing 9, and the sprockets and chain 10 and 11 and 12. The power-transmitting connection thus provided will not interfere with the adjustments of the conveyer.

In operation the plow is lowered into the ground and the machine then driven forward in the direction indicated by the arrow. The traction-wheels, which sustain the greater part of the weight, lead or travel in advance of the plow and steering-wheels. With this arrangement the action of the plow will be steady and certain, the traction being forward or in advance of the resistance. The machine is under the complete control of the engineer or driver on the rear platform. The fireman will occupy the forward platform R.

What I claim as my invention is—

1. A steam automobile grading and ditching machine comprising an engine and boiler supported upon front traction-wheels and rear steering-wheels, a plow arranged in rear of one of said traction-wheels, a conveyer arranged to receive the soil from said plow and to discharge the same at one side of the machine, and power-transmitting connections between the engine, traction-wheels and conveyer, substantially as described.

2. An automobile grading and ditching machine, comprising motive power supported upon front traction-wheels and rear steering-wheels, a plow, a conveyer arranged to receive the soil from said plow and discharge the same at one side of the machine, and power-transmitting connections between the motive power, the traction-wheels and the conveyer, substantially as described.

3. An automobile excavator comprising a horizontal boiler supported by front traction-wheels and rear steering-wheels, adjusting devices mounted upon said boiler, a plow and conveyer suspended from said adjusting devices, an engine mounted upon said boiler, and power-transmitting connections between the engine, traction-wheels and the conveyer, substantially as described.

4. A steam-excavator comprising a horizontal boiler provided at its forward end with a fire-box and supported by front traction-wheels and rear steering-wheels, a plow arranged in rear of one of said traction-wheels, a belt conveyer hung from the waist portion of the boiler and arranged to receive the soil from the plow and convey and discharge the same at one side of the machine, adjusting devices for raising and lowering the plow and conveyer and operable from the rear end of the machine, steering-gear operable also from the rear end of the machine, an engine mounted upon the machine, and power-transmitting connection between engine, traction-wheels and conveyer, substantially as described.

5. An automobile excavator consisting of a traction-engine having front traction-wheels and rear steering-wheels, and having excavating devices hung from the waist portion of its boiler, the machine being operated and controlled from a platform arranged over said rear steering-wheels, substantially as described.

In witness whereof I hereunto subscribe my name this 15th day of February, A. D. 1901.

MORTON G. BUNNELL.

Witnesses:
A. M. BELFIELD,
HARVEY L. HANSON.